United States Patent [19]

Kerr

[11] Patent Number: 5,001,723
[45] Date of Patent: Mar. 19, 1991

[54] SINUSOIDAL M-ARY ORTHOGONAL KEYED DECODING

[75] Inventor: Leo A. Kerr, Woodstock, Md.

[73] Assignee: Allied Signal Inc., Morris Township, Morris County, N.J.

[21] Appl. No.: 794,917

[22] Filed: Nov. 5, 1985

[51] Int. Cl.[5] ............................................. H04L 27/30
[52] U.S. Cl. ............................................ 375/1; 375/85; 375/87; 375/94; 375/96; 375/83; 364/819; 455/61; 329/304; 329/305; 329/306; 380/46
[58] Field of Search ................... 375/1, 94, 96, 84–87; 380/34–35, 31, 46; 455/59–61; 364/728, 819, 821, 823; 329/304–306, 310

[56] References Cited

U.S. PATENT DOCUMENTS

| | | |
|---|---|---|
| 3,204,034 | 8/1965 | Ballard et al. |
| 3,518,547 | 6/1970 | Filipowsky. |
| 3,916,313 | 10/1975 | Lowry .................................. 375/1 |
| 4,017,798 | 4/1977 | Gordy et al. ....................... 375/1 |
| 4,164,628 | 8/1979 | Ward et al. |
| 4,203,071 | 5/1980 | Bowles et al. |
| 4,308,617 | 12/1981 | German, Jr. ........................ 375/1 |
| 4,346,475 | 8/1982 | Alexis ................................. 375/1 |
| 4,428,062 | 1/1984 | Michaels .......................... 364/821 |
| 4,653,069 | 3/1987 | Roeder ............................. 380/31 |
| 4,707,839 | 11/1987 | Andren et al. ..................... 375/1 |

Primary Examiner—Thomas H. Tarcza
Assistant Examiner—Bernarr Earl Gregory
Attorney, Agent, or Firm—Howard G. Massung; Robert A. Walsh

[57] ABSTRACT

A spread spectrum communications system is described for recovering data from a signal having a first carrier frequency modulated by one of at least four phase modulations, each phase modulation orthogonal to one another and the signal further modulated by a predetermined spreading function incorporating a frequency synthesizer for generating a plurality of frequencies, including one of the phase modulations, a plurality of mixers, a combiner, a broadband convolver, a second combiner coupled to a reference signal generator for generating respective orthogonal modulations on spaced apart carrier frequencies, a power divider coupled to the output of the convolver and filters each having a frequency passband for recovering or separating the output signals of the convolver. The invention overcomes the problem of additional hardware complexity to accomodate Walsh orthogonal functions and of requiring a plurality of broadband convolvers to decode a plurality of orthogonal modulations of lesser bandwidth.

10 Claims, 5 Drawing Sheets

SINUSOIDAL M-ARY ORTHOGONAL KEYED DECODING

CROSS REFERENCE TO RELATED APPLICATION

Cross reference is made to U.S. patent application Ser. No. 692,798 filed on Jan. 18, 1985 entitled "Frequency Multiplexed Convolver Communication System" by L. A. Kerr and assigned to the assignee herein, which is directed to recovering data from a first signal having a carrier frequency and at least one of a plurality of predetermined orthogonal modulations thereon utilizing a convolver.

BACKGROUND OF THE INVENTION

1. Field of the Invention:

This invention relates to spread spectrum communication systems and more particularly to a receiver for decoding M-ary orthogonal keying data modulation signals.

2. Description of the Prior Art:

M-ary Orthogonal Keying (MOK) data modulation is a technique used in spread spectrum communications where one basic spreading function, such as a pseudo noise (PN) sequence is phase modulated on a carrier. The spreading function is modified by certain other functions, such as Walsh functions to cause a modulation orthogonal to the basic function and every other modulating function used. The resultant response of a signal in a channel filtered in a matched filter to an orthogonally modulated signal is zero, while the response in a matched filter to nonorthogonal signals is maximum.

The modulation of the spreading function with orthogonal functions is used extensively in secure communications, both for continuous communications and short message formats. Spreading the small amount of information pseudo randomly over a wide bandwidth allows a low probability of intercept (LPI) since the signal power density can be below the noise power density. Only by knowing the spreading function can the signal energy be integrated above the noise. Presently, orthogonal keyed data is recovered by implementing parallel decoding devices, such as correlators or convolvers and then comparing the filtered amplitudes as in a Mark and Space receiver. Using higher M-ary than binary orthogonal keyed (BO) data modulations at low bandwidths, where processing at base band is practical, parallel processing for decoding the orthogonal modulations using partial sums from a single decoder of the basic PM spreading function is sometimes implemented. For medium bandwidth modulation, where the spreading function is changing after short intervals, convolvers are generally used. One example of a surface acoustic wave convolver is described in U.S. Patent 4,428,062 which issued on Jan. 24, 1984 to P. A. Michaels and assigned to The Bendix Corporation. In '062 two transducers are shown spaced apart for launching surface acoustic waves along a path between the two transducers. The interaction of the surface acoustic waves causes a voltage at each point which is collected by a metal conductor overlying the interaction region. A convolver such as described in '062 is capable of much wider bandwidths than can be obtained in base band processing. At present the excess bandwidth over that required for modulation decoding is not used.

In place of M-ary orthogonal keying, frequency hopping provides another form of orthogonal modulation since the signal modulated by one frequency has no response on the other frequency (or very little). Frequency hopping is accomplished by selecting frequencies that are spaced by at least the reciprocal chip width, thus it uses much more bandwidth.

It is therefore desirable to use an M-ary orthogonal keyed signal which utilizes linear phase orthogonal modulation for a minimum bandwidth to include the M-ary orthogonal keyed signal modulations.

It is further desirable to frequency multiplex a plurality of reference signals to one input of a broadband convolver for decoding linear phase orthogonal modulation signals.

It is further desirable to provide an M-ary orthogonal keying symbol modulation which contains the psuedo noise (PN), binary phase shift keying (BPSK) modulation plus a different number of integral cycles of linear phase modulation across the symbol.

SUMMARY OF THE INVENTION

An apparatus and method is described for generating a first signal having a first carrier frequency modulated by one of at least four phase modulations, each phase modulation orthogonal to one another, the first carrier frequency further modulated by a predetermined spreading function, and for recovering data from the first signal comprising coupling the first signal to a first input of at least first through fourth mixers, each having a second input and an output, coupling second through fifth signals having spaced apart second through fifth frequencies, respectively, to the second input of the first through fourth mixers, respectively, coupling the output from each of the first through fourth mixers to a first input terminal of a convolver for convolving signals and having a second input terminal and output terminal, coupling sixth through ninth signals having spaced apart second through fifth frequencies plus at least four phase modulations, respectively, to a first input of first through fourth balanced modulators, respectively, coupling the predetermined spreading function which has been reversed in time to a second input of the first through fourth balanced modulators, coupling an output signal from each of the first through fourth balanced modulators to the second input terminal of the convolver, coupling the output terminal of the convolver to an input of at least first through fourth filters, the first through fourth filters each having a respective frequency bandpass to provide at least first through fourth output signals, respectively, representative of the convolution of the sixth through ninth signals, having at least the four phase modulations thereon, respectively, with the first signal.

DESCRIPTION OF THE PREFERRED EMBODIMENT

Figure 1:
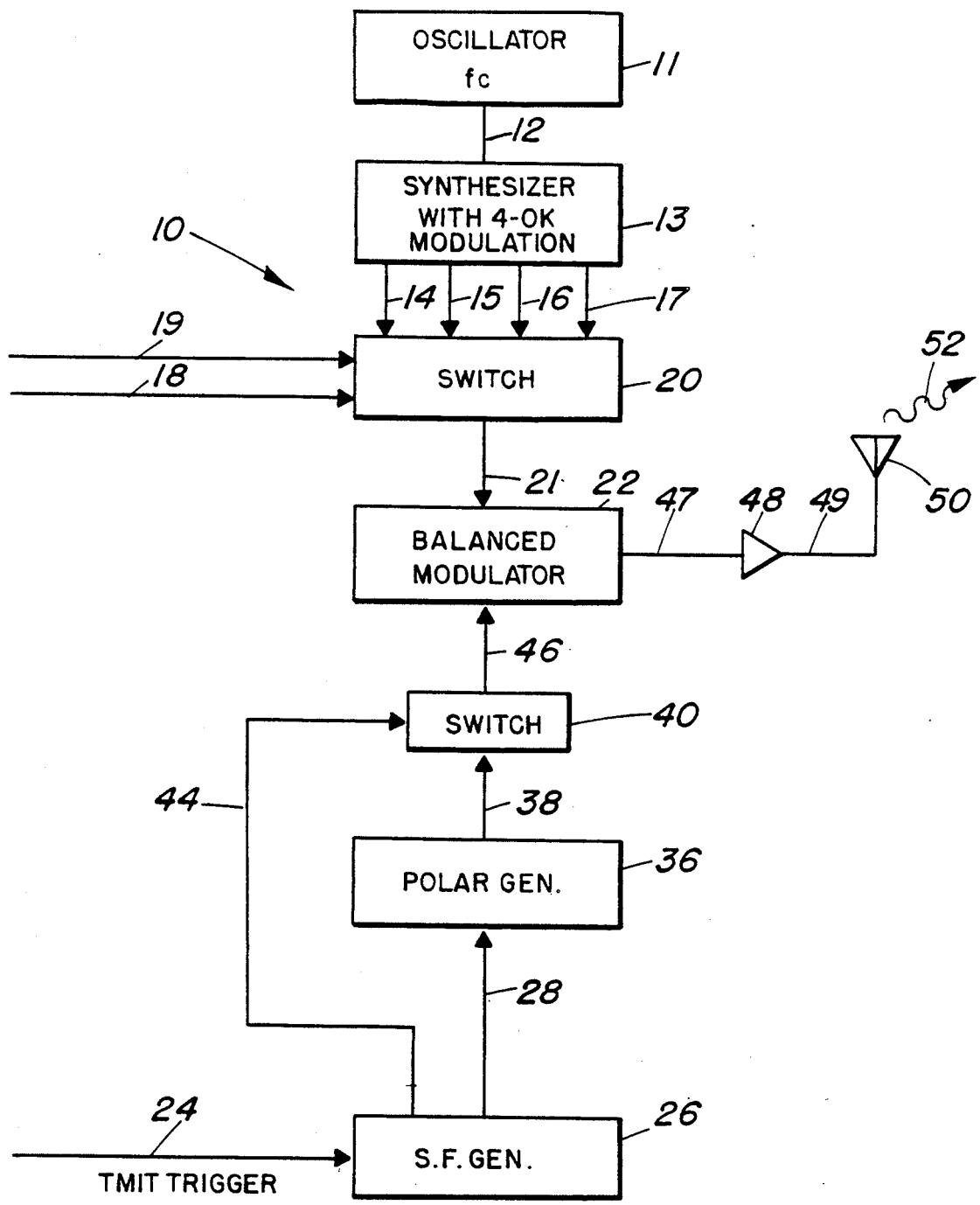
FIG. 1 is a block diagram of one embodiment of the invention showing a transmitter.

Referring to FIG. 1, a block diagram of a spread spectrum signal generator 10 is shown. Spread spectrum signal generator 10 may, for example, generate a signal suitable for transmitting, consisting of a carrier frequency with 128 chips of spreading function data referred to herein as a symbol. The chips of data may be binary phase shift keyed (BPSK), minimum shift keyed (MSK), quaternary phase shift keyed (QPSK), etc. and modulated with a pseudo random noise (PN) spreading function (SF). The spreading function may be 4-ary orthogonally keyed (4-OK) data modulated. The spreading function may be M-ary orthogonally keyed (M-OK) data modulated where M is an integer. For 4-ary orthogonally keyed data the modulation may be, for example, $\sin n\theta$, where n is 0, 1, 2 and 4, as shown by curves 54–57 in FIGS. 2A through 2D. The $\sin n\theta$ functions shown by curves 54–57 in FIGS. 2A through 2D provide a linear phase gradient or frequency shift to the symbol consisting for example of 128 chips. The duration of the symbol from $T_1$ to $T_2$ is shown by curve 58 in FIG. 2E. The $\sin n\theta$ functions provide a linear phase gradient across the symbol for M-OK modulation such that there is an integral number of 360° phase shifts (or cycles) from $T_1$ to $T_2$. In FIGS. 2A through 2D $\sin n\theta$ function is shown with zero phase at $T_1$. The initial phase $\phi$ at $T_1$ is arbitrary since $\sin n\theta$ is linear.

As shown in FIG. 1, spread spectrum signal generator 10 includes an oscillator 11 for generating a carrier frequency $f_c$ which may be, for example, 1.23 GHz. The output of oscillator 11 is coupled over line 12 to an input of synthesizer 13 which functions to add the modulation function $\sin n\theta$ to the carrier frequency $f_c$. For example, if the time duration between $T_1$ and $T_2$ is 16 us then the frequency for one cycle to occur during the symbol time is 62.5 kHz. The frequency for two cycles to occur during the symbol length is 125 kHz and the frequency for four cycles to occur is 250 kHz. The output of synthesizer 13 with the respective phase modulation added to the carrier frequency $f_c$ for n equals 0, 1, 2, and 4 is provided on output lines 14–17, respectively. Output lines 14–17 have a frequency, for example, of 1.230 GHz, 1.2300625 GHz, 1.230125 GHz and 1.230250 GHz, respectively. Data is coupled over lines 18 and 19 to an input of switch 20. The data in the form of a two line code on lines 18 and 19 provide four different combinations of voltage levels corresponding to four $\sin n\theta$ functions. Switch 20 functions to respond to the data on lines 18 and 19 to select one of the signals on lines 14–17, which is coupled over line 21 to one input of balance modulator 22.

A control signal TMIT TRIGGER, such as a pulse, is coupled over line 24 to an input of spreading function generator 26. Spreading function generator 26 functions to generate a serial code, 128 chips long, which may simulate a pseudo random noise (PN) sequence. The output of spreading function generator 26 is coupled over line 28 to an input of bipolar generator 36.

Figure 2E:
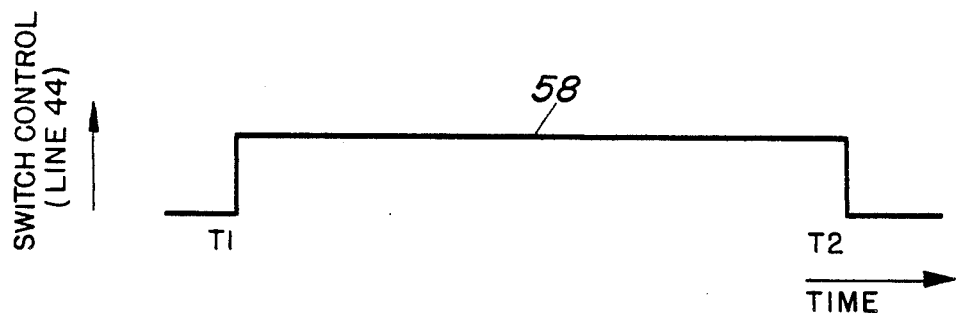
FIGS. 2A through 2E show modulation waveforms for the embodiment of FIG. 1.
Figure 2D:
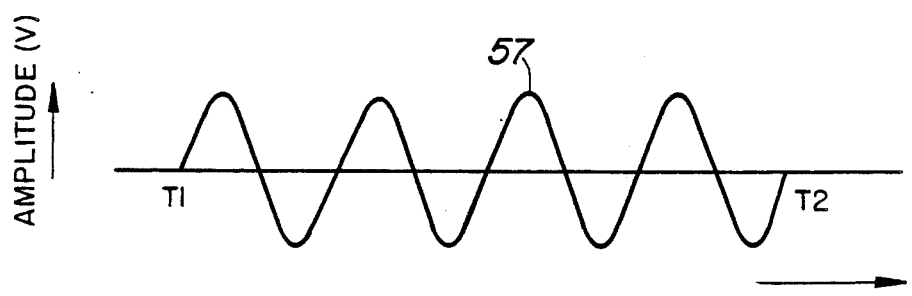
Figure 2C:
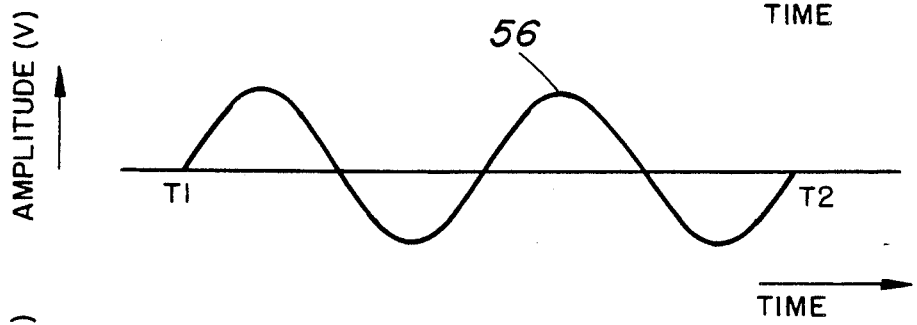
Figure 2B:
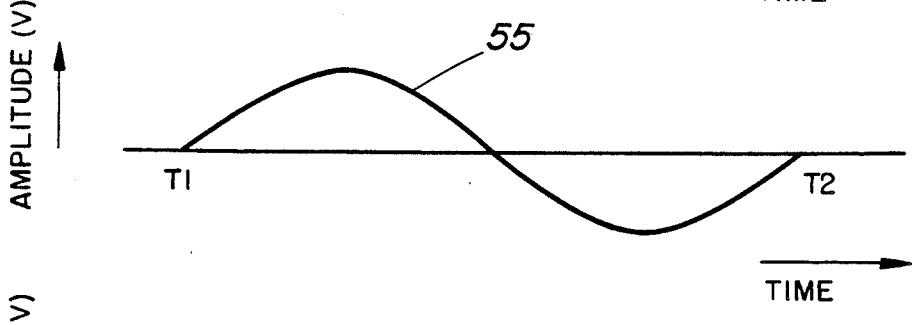
Figure 2A:
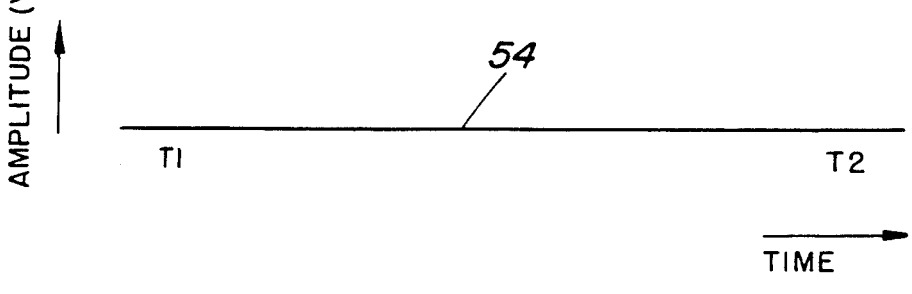

Bipolar generator 36 functions to provide a voltage translation from a digital signal typically represented by a plus voltage and zero volts to a bipolar signal represented by a plus voltage and a minus voltage or a logic one and zero, respectively. The output of bipolar generator 36 is coupled over line 38 to an input of switch 40. A second output of spreading function generator 26 having a signal duration from $T_1$ to $T_2$ as shown, for example, in FIG. 2E, is coupled over line 44 to a second input of switch 40. Switch 40 functions to eliminate circuit transient states from bipolar generator 36 by time gating the signal on line 38 with the signal on line 44. The output of switch 40 is coupled over line 46 to an input of balanced modulator 22. The signal on line 46 modulates the signal on line 21 to provide a spread spectrum signal having a carrier frequency $f_c$ on line 47 modulated by $\sin n\theta$ and by a PN spreading function, which may be 128 chips long. The output of balanced modulator 22 is coupled over line 47 to an input of amplifier 48. Amplifier 48 functions to amplify the spread spectrum signal on line 47. The output of amplifier 48 is coupled over line 49 to antenna 50, wherein the spread spectrum signal is radiated as shown by arrow 52.

Referring to FIGS. 2A–2D, curves 54–57 show $\sin n\theta$ waveforms which are added to the carrier frequency by synthesizer 13. In FIGS. 2A–2D the ordinate represents amplitude in volts and the abscissa represents time. These four different constant frequencies are four different linear phase change signals.

Referring to FIG. 2E, curve 58 shows the symbol length from $T_1$ to $T_2$. In FIG. 2E the ordinate represents amplitude and the abscissa represents time. Between times $T_1$ and $T_2$ a PN spreading function is present which may be 128 chips long and equally spaced in time.

Figure 3:
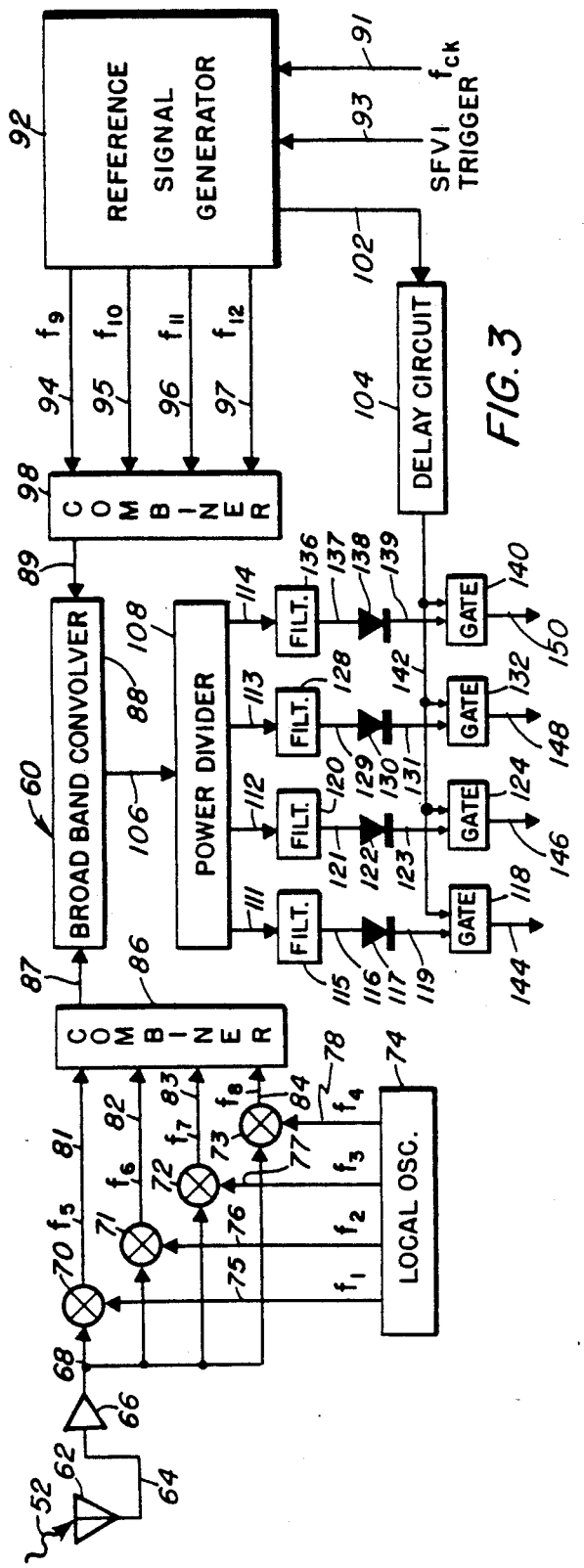
FIG. 3 is a block diagram of one embodiment of the invention showing a receiver.

FIG. 3 is a block diagram of a spread spectrum receiver 60. Radio signal 52, having a carrier frequency $f_c$ and at least one of a plurality of predetermined orthogonal linear phase modulations thereon, is received by antenna 62 and coupled over line 64 to the input of amplifier 66. Amplifier 66 functions to amplify the received signal and to couple the amplified received signal over line 68 to an input of mixers 70–73. Local oscillator 74 functions to provide frequencies $f_1$ through $f_4$ over lines 75–78 to a second input of mixers 70–73, respectively. Frequencies $f_1$–$f_4$ are spaced apart. Mixers 70–73 convert the incoming radio signal on line 68 to an intermediate frequency. The output of mixers 70–73 having an intermediate frequency $f_5$ to $f_8$, respectively, including the linear phase modulation thereon are coupled over lines 81–84, respectively, to respective inputs of combiner 86. Combiner 86 functions to combine the signals on lines 81–84 to provide a composite signal at its output over line 87 which is coupled to a first input of broadband convolver 88.

Figure 5:
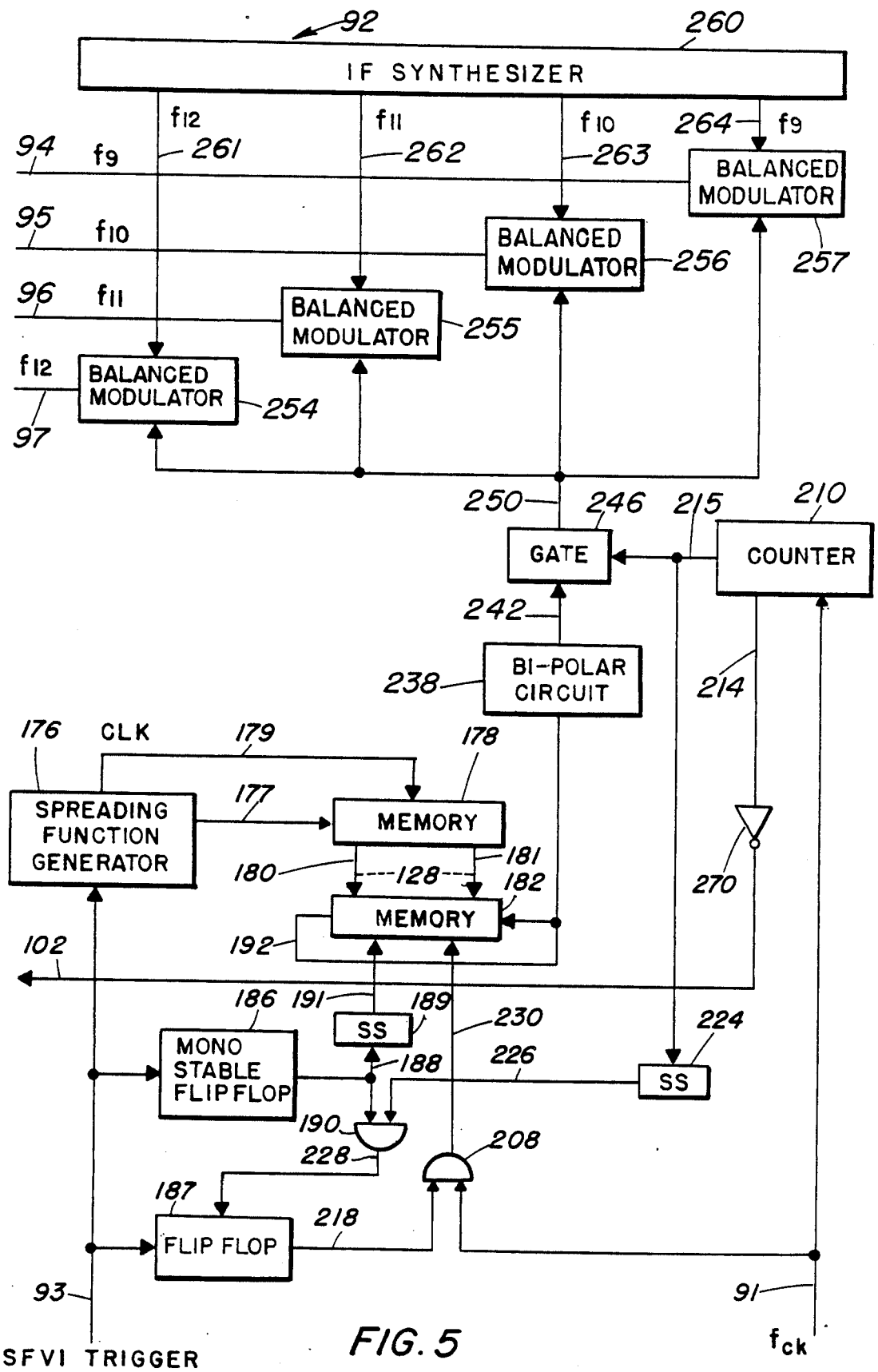
FIG. 5 is a block diagram of one embodiment of a reference signal generator shown in FIG. 3.

Broadband convolver 88 has a second input signal coupled over line 89 from combiner 98 which couples the reference signals to be convolved with the signals or composite signal on line 87. Reference signal generator 92 has a control signal (spreading function validity interval trigger) SFVI TRIGGER coupled over line 93 to a control input. A clock signal $f_{ck}$ is coupled over line 91 to a control input of Reference Signal Generator 92. In response to the SFVI TRIGGER, reference signal generator 92 generates, for example, a pseudo random noise serial binary phase code 128 chips long. Four frequencies, $f_9$ to $f_{12}$ which include a linear phase modulation $\sin n\theta$, respectively, for each n are first phase modulated by the pseudo random noise serial code and then coupled over lines 94–97 to inputs of combiner 98. One embodiment of reference signal generator 92 is shown in FIG. 5. A timing signal which may be, for example, a waveform from counter 210, shown in FIG. 5, is coupled over line 102 to an input of delay circuit 104.

Combiner 98 functions to combine the radio wave or microwave signals having intermediate frequencies $f_{9-12}$ including the PN spreading function modulation and respective orthogonal linear phase modulations. The output of combiner 98 provides a composite signal over line 89 to an input of broadband convolver 88.

The output of broadband convolver 88, which functions to convolve the signals on lines 87 and 89, is coupled over line 106 to an input of power divider 108. Power divider 108 functions to power divide the signal on line 106 and to provide the signal at its output on lines 111–114. The signal on line 111 is coupled through filter 115 over line 116 through detector diode circuit 117 over line 119 to an input of gate 118. The signal on line 112 is coupled through filter 120 over line 121 through detector diode circuit 122 over line 123 to an input of gate 124. The signal on line 113 is coupled through filter 128 over line 129 through detector diode circuit 130 over line 131 to an input of gate 132. The signal on line 114 is coupled through filter 136 over line 137 through detector diode circuit 138 over line 139 to an input of gate 140.

Filters 115, 120, 128 and 136 each have a predetermined passband to separate from the output signal on line 106 or 111 the output signal corresponding to the convolution of two selected signals, such as the signals on lines 81 and 94, where frequency $f_5$ including its linear phase modulation is equal to or close to frequency $f_9$ with its linear phase modulation. The output frequency on line 116 corresponding to the convolution of signals at $f_5$ equal to or close to $f_9$ is approximately $2f_5$ due to the convolution process plus any doppler frequency thereon. A doppler frequency will arise if one of the platforms containing the receiver or transmitter is moving so as to cause a change in distance between the platforms. The separated output signal on line 116 is detected by detector diode circuit 117 to provide an amplitude signal on line 119. Filter 120 may have a passband for separating the output signal on line 112 corresponding to the convolution of two selected signals, for example the signals on lines 82 and 95, where frequency $f_6$ and $f_{10}$ are substantially the same, except for differences in linear phase modulation of the two signals and any doppler frequency. The output of filter 120 is detected by detector diode circuit 122 to provide an amplitude output on line 123. Likewise, filter 128 has a predetermined passband for separating the output signal on line 106 or 113 corresponding to the convolution of the signals on lines 83 and 96, where $f_7$ is substantially equal to the frequency of $f_{11}$, except for differences in linear phase modulation and any doppler frequency. Likewise, filter 136 has a predetermined passband for separating the output signal on line 106 or 114 corresponding to the convolution of the signals on lines 84 and 97, where frequency $f_8$ is substantially equal to frequency $f_{12}$, except for differences in linear phase modulation of the two signals and any doppler frequency.

Detector diode circuits 130 and 138 function to detect the output signals of filters 128 and 136, respectively, to provide an amplitude signal on lines 131 and 139, respectively. The output of delay circuit 104 is coupled over line 142 to a second input of gates 118, 124, 132 and 140. Gates 118, 124, 132 and 140 function to prevent or eliminate spurious signals, since the desired convolution output waveform is shorter in duration, one-half shorter, than the duration of the waveform at line 87. The signals on line 89 are on for one symbol length and off for a symbol length as determined by gate 246. This process also adds the carrier frequencies and any doppler frequency thereon. Delay circuit 104 functions to adjust the time of gating on line 142 with the delay time in broadband convolver 88 due to propagation of the waves prior to the output of a convoluted signal on line 106. The output of gates 118, 124, 132 and 140 is coupled over lines 144, 146, 148 and 150, respectively. The output on lines 144, 146, 148 and 150 provide a signal which may be an analog voltage representative of the convolution of an input signal with a $\sin n\theta$ linear phase modulation with a plurality of reference signals having respective orthogonal linear phase modulations, such as $\sin n\theta$, where n is equal to 0, 1, 2 and 4.

Figure 4:
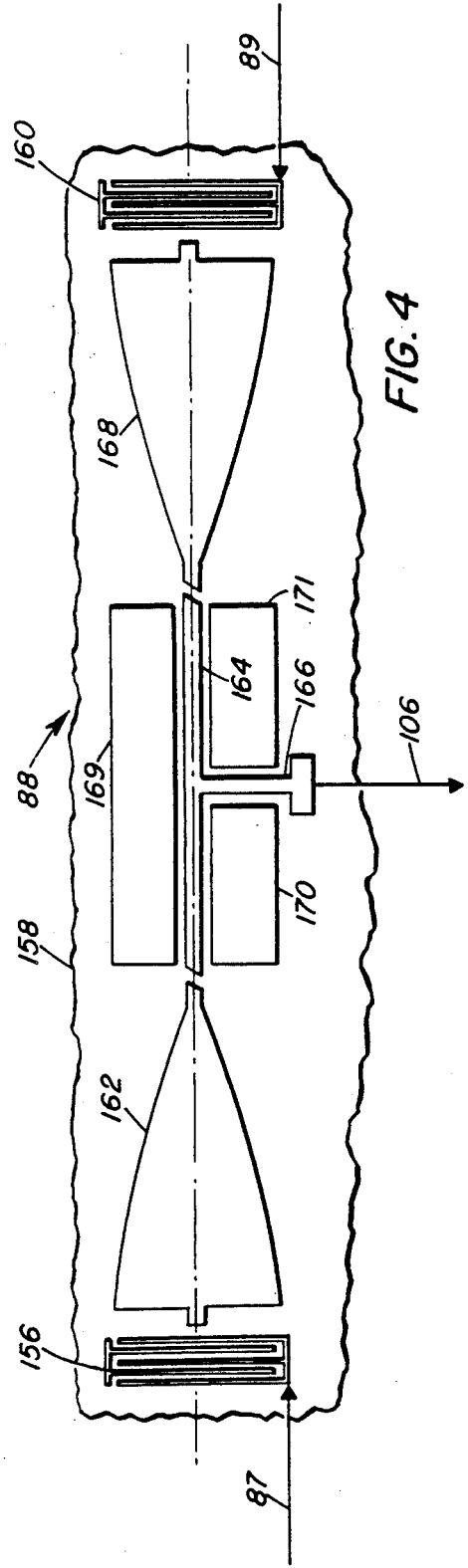
FIG. 4 is a top view of one embodiment of a broadband convolver.

One example of a broadband convolver 88 is described in U.S. Pat. No. 4,428,062 which issued on Jan. 24, 1984 to P. A. Michaels and assigned to The Bendix Corporation. FIG. 4 is a top view of the broadband convolver described in U.S. Pat. No. 4,428,062. Briefly, line 87 is coupled to transducer 156 which functions to launch a surface acoustic wave in piezoelectric substrate 158 in the direction towards transducer 160. Horn 162 functions to compress the surface acoustic wave energy along the path covered by metallization 164. Metallization 164 sums the voltage along piezoelectric substrate due to the interaction of a surface acoustic wave launched from transducer 160. Metallization 166 is coupled to metallization 164 to couple the voltage out to a terminal suitable for connecting to line 106. Horn 168 functions to compress the surface acoustic wave launched by transducer 160. Metallizations 169, 170 and 171 are coupled to ground and function to guide the surface acoustic wave energy undisturbed between transducers 156 and 160.

Referring to FIG. 5 a block diagram is shown of one embodiment of reference signal generator 92. Spreading function generator 176 generates a predetermined spreading function, such as a pseudo random noise binary code which may be the same code as generated by spreading function generator 26 shown in FIG. 1. The binary code may be 128 chips long and coupled over line 177 to an input of memory 178. A clock over line 179 is coupled to a clock input of memory 178. Memory 178 may be, for example, a serial in, parallel out shift register. Memory 178 transfers the data over lines 180 and 181 to the data input of memory 182. Memory 178 may transfer the data in parallel, that is 128 chips are loaded in parallel into memory 182. Memory 182 may be a parallel in, serially out shift register Spreading function generator 176 responds to spreading function validity interval (SFVI) trigger which is coupled over line 93. In response to receiving SFVI TRIGGER, spreading function generator 176 generates a new code of 128 chips which is loaded in serial into memory 178 where memory 178 is a serial in, parallel out shift register Control signal SFVI trigger is also coupled to monostable flip flop 186 and to flip flop 187. The output of monostable flip flop 186 is coupled over line 188 to an input of single shot circuit 189, which generates a single pulse in response to the output of flip flop 186. Line 188 is also coupled to an input of AND gate 190. The output of single shot circuit 189 is coupled over line 191 to the control input for loading memory 182. Monostable flip flop 186 functions to provide a delay until memory 178 is loaded with a new 128 chip code. Single shot 189 then provides a pulse to memory 182 which loads the 128 bit code into memory 182. The output of memory 182 is coupled over line 192 to a serial data input of memory 182 and to an input of bipolar circuit 238.

The spreading function stored in memory 182 is held so that it can be timed by counter 210. A clock signal $f_{ck}$ which may be, for example, 8 MHz is coupled over line 91 to an input of AND gate 208 and to the clock input of counter 210. Counter 210 may be, for example, an eight stage counter counting up to $2^8$ counts. Since the clock signal $f_{ck}$ is equal to the chip rate of the expected received signal, then counter 210 will count up, causing the most significant bit (MSB) of counter 210 to have a half period equal to 128 chips, which is the desired symbol length. In order to insure that clocking of the spreading function waveform stored in memory 182 is synchronized with counter 210, clock pulses on line 91 are gated through AND gate 208 which has a second input from flip flop 187 over line 218. Flip flop 187 which is set by SFVI trigger on line 93 functions to inhibit clock signals $f_{ck}$ from passing through AND gate 208 until the new spreading function code has been loaded into memory 182. Monostable flip flop 186 provides a One output on line 188 at times after SFVI trigger. The most significant bit of counter 210 is coupled over line 215 to ar input of single shot circuit 224. Single shot circuit 224 provides a pulse on line 226 upon receiving a positive-going leading edge on line 215. The time of a positive-going leading edge on line 215 corresponds to curve 58 in FIG. 2E at $T_1$. The pulse on line 226 is coupled to a second input of AND gate 190 which provides an output on line 22 to flip flop 187 which sets flip flop 187 to a One, providing a logic One signal on line 218. Thus at time $T_1$, AND gate 208 passes clock signal $f_{ck}$ over line 230 to the clock input of memory 182 which clocks the code out of memory 182 over line 192 time reversed. Thus, the spreading function code is clocked out of memory 182 in time reverse order at the chip rate coincident with the signal on line 215 from counter 210.

Bipolar circuit 238 functions to provide an output signal of plus V volts and minus V volts representative of a logic One and a logic Zero which is coupled over line 242 to a first input of gate 246. Gate 246 has a second input coupled to line 215 which provides a waveform corresponding to curve 58 in FIG. 2E, which may be the symbol length of 128 chips. The output of gate 246 is coupled over line 250 to an input of balanced modulators 254–257.

Intermediate frequency synthesizer 260 functions to generate four frequencies $f_{12-9}$ which are spaced apart in frequency and include a linear phase modulation sin $n\theta$, respectively, for each n and are coupled over lines 261–264, respectively, to a second input of balanced modulators 254–257, respectively. Frequencies $f_{12-9}$ including a linear phase modulation sin $n\theta$ may be, for example, 375.250 MHz, 350.125 MHz, 350.0625 MHz and 300.000 MHz for n equals 4, 2, 1 and 0, respectively. Balanced modulators 254–257 function to modulate the carrier frequencies $f_{12-9}$ with the PN spreading function on line 250 to provide reference signals on lines 94–97, which have respective M-ary orthogonally keyed linear phase modulation and which all have a PN spreading function which is time reversed.

The second most significant bit of counter 210, line 214, is coupled to an input of inverter 270 having an output coupled over line 102. The waveform on line 102 provides a gating waveform to eliminate the spurious signals at the output of gates 118, 124, 132 and 140 shown in FIG. 3.

Referring now to FIGS. 3 and 5, an apparatus and method is described for performing the convolution of an input signal on four different intermediate frequency carriers $f_5$–$f_8$ with four orthogonally modulated reference signals $f_{9-12}$ on the four intermediate frequencies respectively. The composite input signal and reference signals are coupled to respective inputs of a broadband convolver 88 which provides an output signal indicative of the convolution of the input signal and reference signals. The output signal from convolver 88 is divided into four paths and separated by bandpass filters 115, 120, 128 and 136. The signals at the output of the bandpass filters are amplitude detected by detector diode circuits 117, 122, 130 and 138. The modulation on the input signal is determined by which channel lines 119, 123, 131 and 139 has the greatest amplitude at the time of the compressed or peak of the convolution output of the spread spectrum input signal since each intermediate frequency reference signal is associated with a respective sin $n\theta$ function shown by curves 54, 55, 56 and 57 in FIGS. 2A–2D, respectively.

Since the output of the convolver is a function of the composite input signal and the composite reference signal propagating at the same velocity in the broadband convolver 88 in opposite directions, it has the effect of speeding up time so that the convolved output waveform occurs in half the time. The spurious signals occurring in the other time portions is eliminated by gates 118, 124, 132 and 140 which are controlled by the signal on line 142 which may be, for example, the second most significant bit of counter 210.

Figure 6:
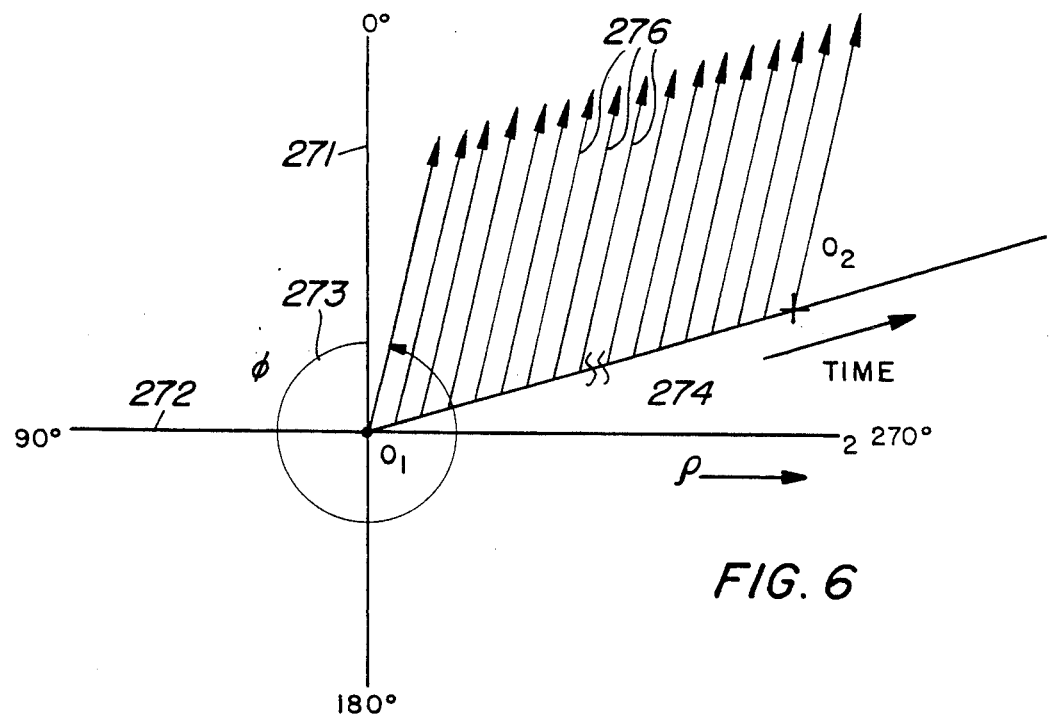
FIG. 6 is a graph showing a sequence of constant phase chip vectors.

FIG. 6 is a graph showing a sequence of constant phase chip vectors 276. In FIG. 6 the reference lines 271 and 272 represent a polar graph having an origin $O_1$, wherein the radial distance from $O_1$ is $\rho$ and the angular rotation about $O_1$ shown by arrow 273 is $\phi$. A third reference line 274 represents a third dimension time extending from $O_1$ at time $T_1$ to $O_2$ at time $T_2$. Chip vectors 276 are spaced apart along reference line 274 with a constant phase shown by angle $\phi$ shown by arrow 273.

Figure 7:
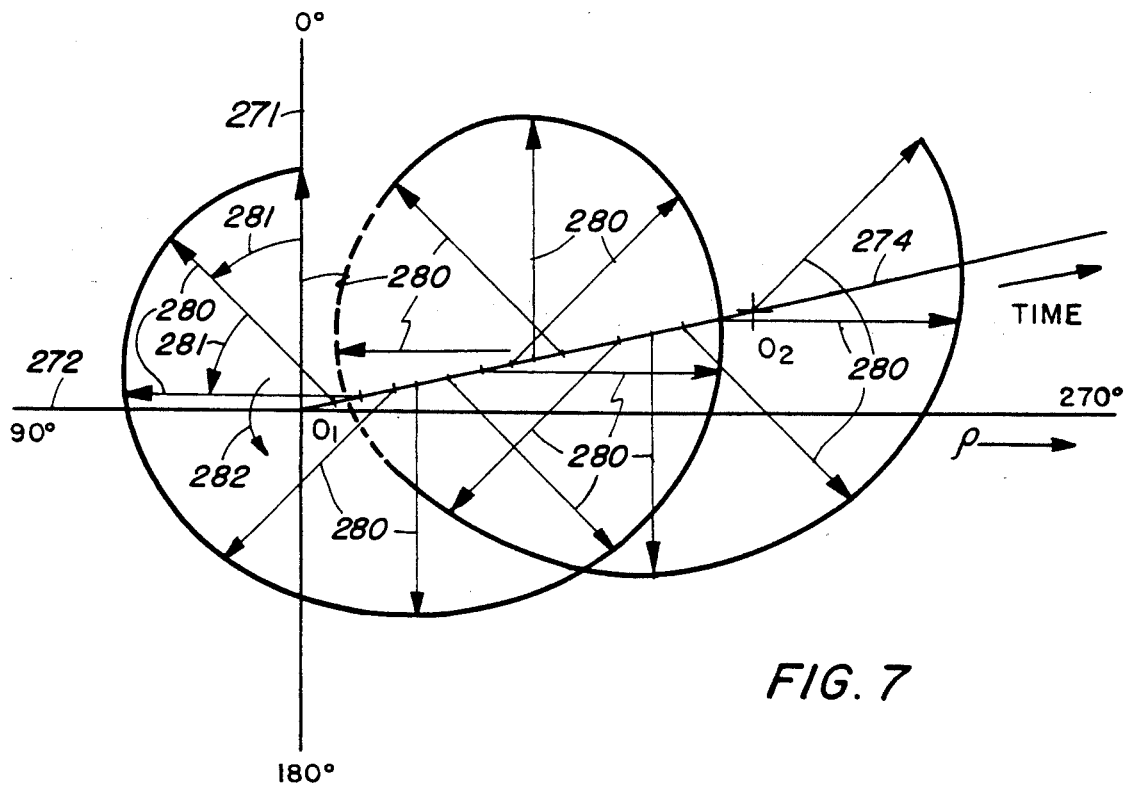
FIG. 7 is a graph showing a sequence of linearly changing phase chip vectors for the embodiment of FIGS. 1 and 3.

FIG. 7 is a graph showing a sequence of changing phase chip vectors for operation of the embodiment of FIGS. 1 and 3. In FIG. 7 like references are used to depict the graph as used in FIG. 6. In FIG. 7 a plurality of chip vectors 280 are shown each having a constant phase increment $\Delta\phi$ from the last chip vector shown by arrows 281 in the direction shown by arrow 282. The chip vectors 280 originate along reference line 274 in spaced apart time increments. While not all 128 chip vectors 280 are shown, a representative number of chip vectors are shown to show that the phase of the chip vectors rotates. For example, 128 chip vectors in a symbol rotate in 5.6° increments from O through 720° from $O_1$ to $O_2$, which corresponds to the symbol duration from $T_1$ to $T_2$.

The invention describes an apparatus and method for generating a first signal having a first carrier frequency modulated by one of at least four phase modulations, sin $n\theta$, where n is an integer, for example, 0, 1, 2 and 4, which are orthogonal phase modulations with respect to each other, the first carrier frequency further modulated by a predetermined spreading function, for example, a PN sequence utilizing BPSK and for recovering data from the first signal comprising coupling the first signal to a first input of at least first through fourth mixers, each having a second input and an output, coupling second through fifth signals having spaced apart second through fifth frequencies, respectively, to the second input of the first through fourth mixers, respectively, coupling the output from each of the first through fourth mixers to a first input terminal of a convolver for convolving signals and having a second input terminal and an output terminal, coupling sixth through ninth signals having spaced apart second through fifth frequencies plus at least four phase modulations, respectively, to a first input of first through fourth balanced modulators, respectively, coupling the predetermined spreading function which has been reversed in time to a second input of the first through fourth balanced modulators, coupling an output signal from each of the first through fourth balanced modulators to the second input terminal of the convolver, coupling the output terminal of the convolver to an input of at least first through fourth filters, the first through fourth filters each having a respective frequency bandpass to provide at least first through fourth output signals, respectively, representative of the convolution of the sixth through ninth signals, having at least four phase modulations thereon, respectively, with the first signal.

The invention claimed is:

1. Apparatus for recovering data from a first signal having a first carrier frequency modulated by one of at least four phase modulations, each phase modulation orthogonal to one another, said first carrier frequency further modulated by a predetermined spreading function comprising:

first means for coupling said first signal to a first input of at least first through fourth mixers, each having a second input and an output, second means for coupling second through fifth signals having spaced apart second through fifth frequencies, respectively, to said second input of said first through fourth mixers, respectively, third means for coupling said output from each of said first through fourth mixers to a first input terminal of a convolver for convolving signals and having a second input terminal and an output terminal, fourth means for coupling sixth through ninth signals having spaced apart second through fifth frequencies respectively, to a first input of first through fourth balanced modulators respectively, said sixth through ninth signals having been further modulated by said at least four phase modulations, respectively, fifth means for coupling said predetermined spreading function which has been reversed in time to a second input of said first through fourth balanced modulators, sixth means for coupling an output signal from each of said first through fourth balanced modulators to said second input terminal of said convolved, and seventh means for coupling said output terminal of said convolver to an input of at least first through fourth filters, said first through fourth filters each having a respective frequency bandpass to provide at least first through fourth output signals respectively representative of the convolution of said sixth through ninth signals having at least said four phase modulations thereon, respectively, with said first signal.

2. The apparatus of claim 1 wherein said four phase modulations are each linear phase modulations.

3. The apparatus of claim 2 wherein said first signal includes a symbol having a predetermined time duration and wherein said linear phase modulation provides an integral number of 360° phase shifts across said symbol.

4. The apparatus of claim 2 wherein said first signal includes a symbol modulated by said predetermined spreading function and wherein said at least four phase modulations each provide a unique number r of cycles across said symbol where n is an integer.

5. The apparatus of claim 4 wherein n is 0, 1, 2, and 4 to provide 4-ary orthogonal keyed modulation.

6. A method for recovering data from a first signal having a first carrier frequency modulated by one of at least four phase modulations, each phase modulation orthogonal to one another, said first carrier frequency further modulated by a predetermined spreading function comprising the steps of:

coupling said first signal to a first input of at least first through fourth mixers, each having a second input and an output, coupling second through fifth signals having spaced apart second through fifth frequencies, respectively, to said second input of said first through fourth mixers, respectively, coupling said output from each of said first through fourth mixers to a first input terminal of a convolver for convolving signals and having a second input terminal and an output terminal, coupling sixth through ninth signals having spaced apart second through fifth frequencies respectively, to a first input of first through fourth balanced modulators respectively, said sixth through ninth signals having been further modulated by said at least four phase modulations, respectively, coupling said predetermined spreading function which has been reversed in time to a second input of said first through fourth balanced modulators, coupling an output signal from each of said first through fourth balanced modulators to said second input terminal of said convolver, and coupling said output terminal of said convolver to an input of at least first through fourth filters, said first through fourth filters each having a respective frequency bandpass to provide at least first through fourth output signals respectively representative of the convolution of said sixth through ninth signals having at least said four phase modulations thereon, respectively, with said first signal.

7. The method of claim 6 wherein said four phase modulations are each linear phase modulations.

8. The method of claim 7 wherein said first signal includes a symbol having a predetermined time duration and wherein said linear phase modulation provides an integral number of 360° phase shifts across said symbol.

9. The method of claim 7 wherein said first signal includes a symbol modulated by said predetermined spreading function and wherein said at least four phase modulations each provide a unique number n of cycles across said symbol where n is an integer.

10. The method of claim 9 wherein n is 0, 1, 2, and 4 to provide 4-ary orthogonal keyed modulation.

* * * * *